(No Model.)

F. BAYLIS.
HAY DISTRIBUTER FOR BARNS.

No. 283,191. Patented Aug. 14, 1883.

WITNESSES:
Chas. Nida
C. Sedgwick

INVENTOR:
F. Baylis
BY Munn & Co.
ATTORNEYS.

UNITED STATES PATENT OFFICE.

FRANK BAYLIS, OF AMENIA, NEW YORK.

HAY-DISTRIBUTER FOR BARNS.

SPECIFICATION forming part of Letters Patent No. 283,191, dated August 14, 1883.

Application filed June 13, 1883. (No model.)

*To all whom it may concern:*

Be it known that I, FRANK BAYLIS, of Amenia, in the county of Dutchess and State of New York, have invented a new and useful Improvement in Hay-Distributers for Barns, of which the following is a full, clear, and exact description.

Reference is to be had to the accompanying drawings, forming a part of this specification, in which similar letters of reference indicate corresponding parts in both figures.

Figure 1:
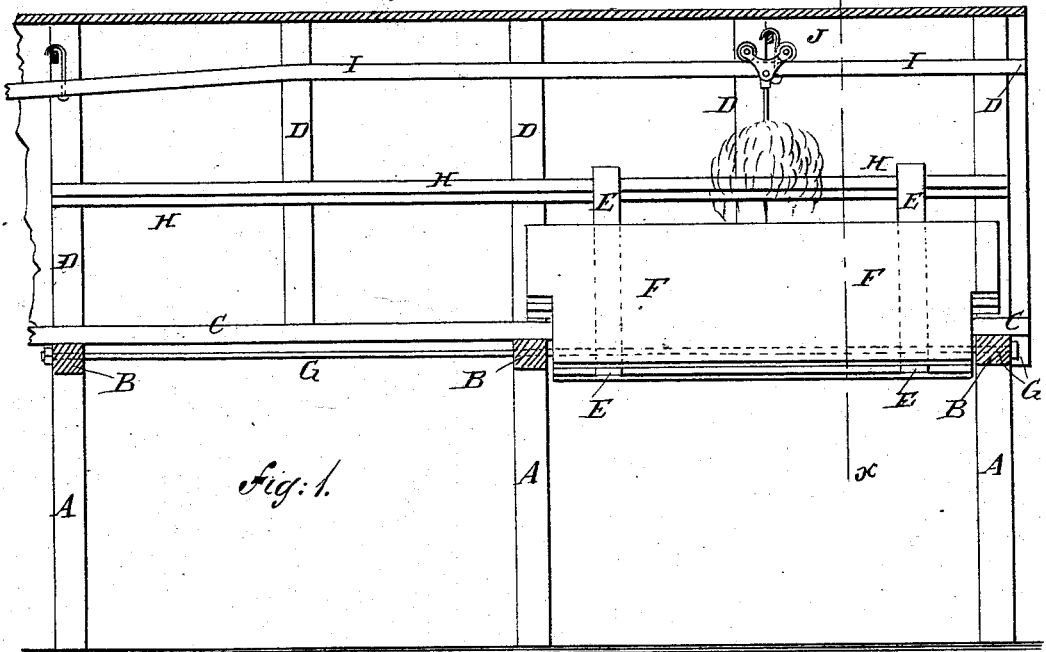
Figure 2:
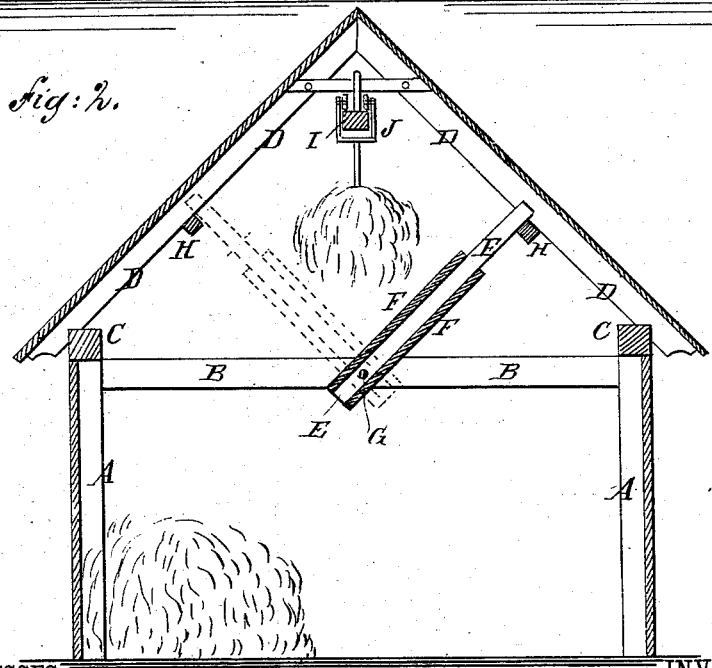

Figure 1 is a side elevation of my improvement, shown as applied to the frame of a barn. Fig. 2 is a sectional end elevation of the same, taken through the line $x$ $x$, Fig. 1.

The object of this invention is to provide a simple, convenient, and effective means for distributing hay as it is discharged from a carrier into the outer parts of the mow.

The invention consists of an apron hinged at its lower part to the beams of the barn by an iron rod, and supported at its upper part in an inclined position by bars attached to the rafters of the said barn, as will be hereinafter fully described.

A represents the posts, B the beams, C the plates, and D the rafters, of an ordinary barn.

E are two or more bars, to the opposite sides of which are attached boards F, so that both sides or faces of the apron thus formed will be smooth. Through holes in the lower parts of the bars E is passed an iron rod, G, which also passes through holes in the beams B, and is secured in place by a head upon one end and a nut upon the other, or by nuts upon both ends, as may be desired. The apron E F is made of such a length as to reach from one beam B to the next beam, and the bars E are made of such a length that their upper ends will rest against bars H, attached to the rafters D in such positions as will give the desired inclination to the said apron E F. In case the mow is wide and has a beam B over it, two aprons E F can be used, or the apron can be changed from one part of the rod G to the other, as may be required.

I represents the track for the carrier J, by means of which the hay is raised from the wagon and carried over and dropped into the mow. As the hay falls from the carrier J it strikes the apron E F, slides down the said apron, and is projected to the outer part of the mow.

When desired, the apron can be turned upon the rod G as a hinge, as indicated in dotted lines in Fig. 2, so as to project the hay to the other side of the mow.

Having thus described my invention, I claim as new and desire to secure by Letters Patent—

1. A hay-distributer constructed substantially as herein shown and described, and consisting of the apron E F, the hinging-rod G, and the supporting-bars H, as set forth.

2. In a hay-distributer, the combination, with the beams B and rafters D of a barn, of the apron E F, the hinging-rod G, and the supporting-bars H, substantially as herein shown and described, whereby hay dropped from a carrier over the middle part of the mow will be guided to the side parts of the said mow, as set forth.

FRANK BAYLIS.

Witnesses:
NEWTON HEBARD,
HARRY B. RUNDALL.